Feb. 6, 1945. H. E. CARNAGUA ET AL 2,368,801
CONTROL MECHANISM FOR TRANSMISSIONS
Filed Jan. 9, 1942 3 Sheets-Sheet 3
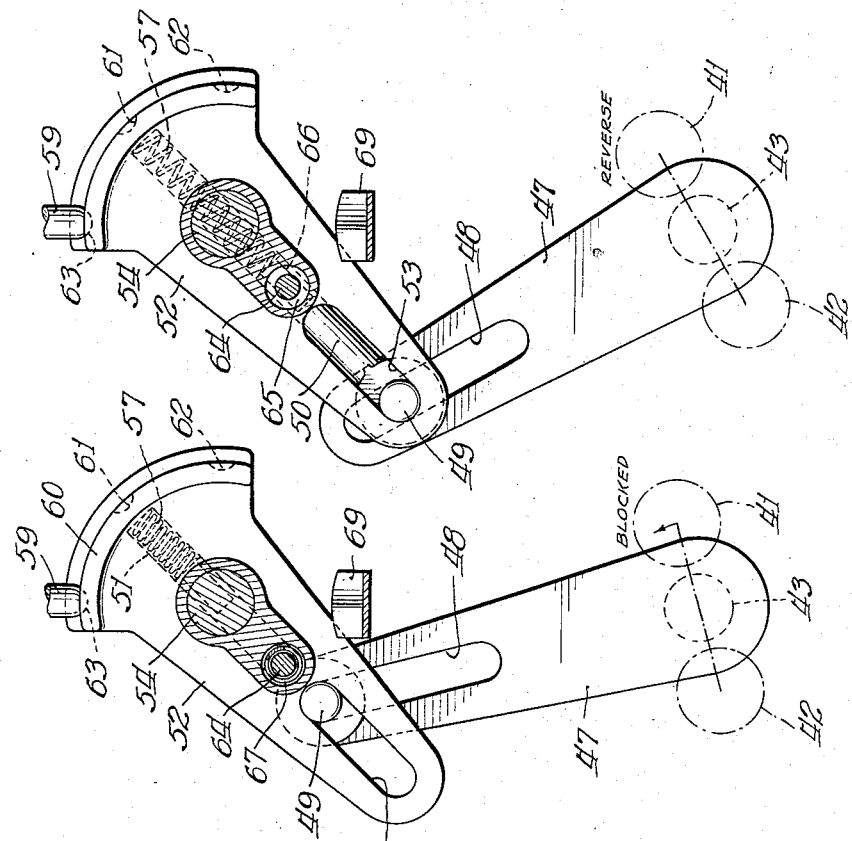
Inventors:
Harold E. Carnagua
Donald W. Kelbel
By Edward P. Gritzbaugh
Atty.

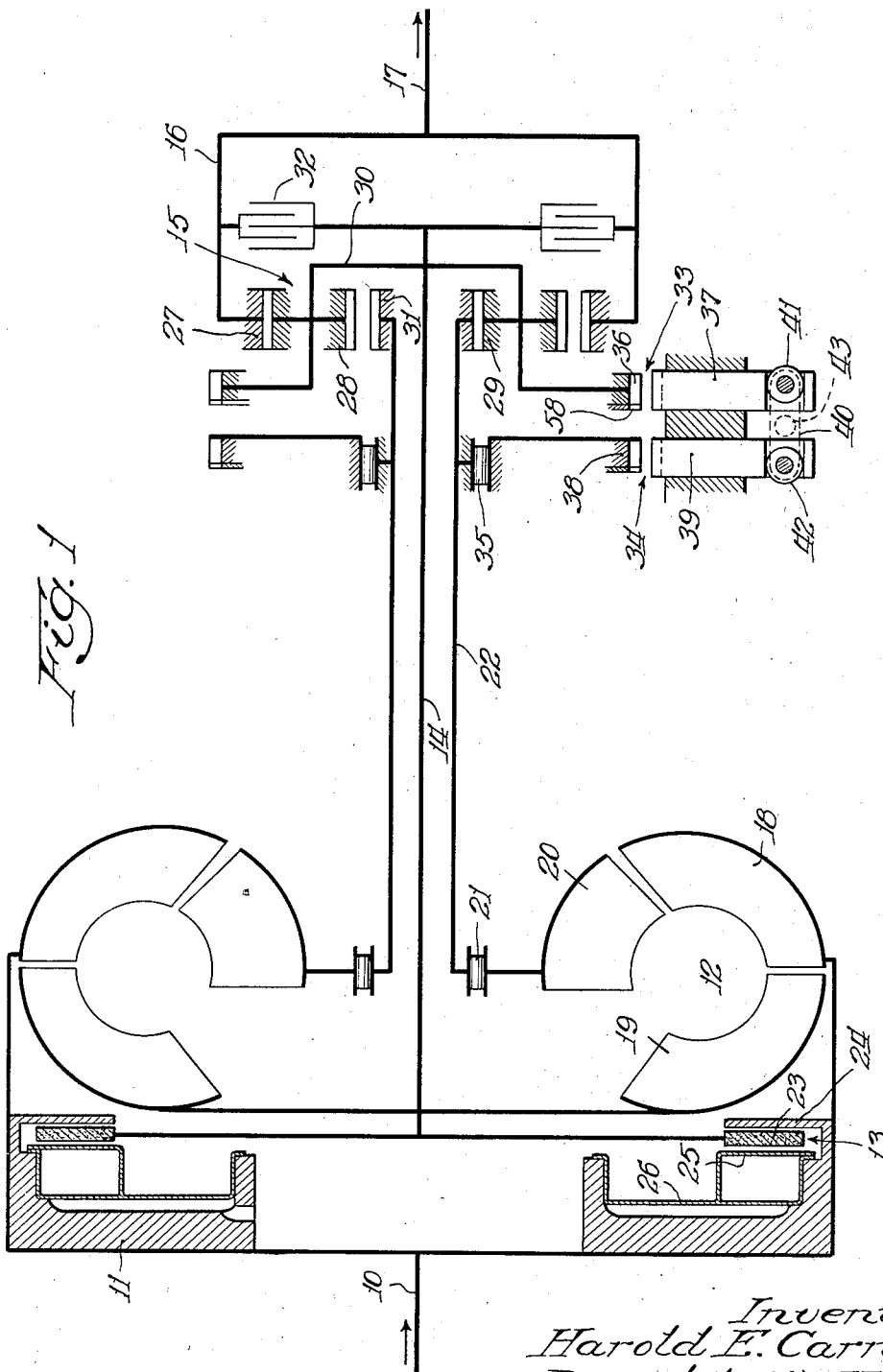

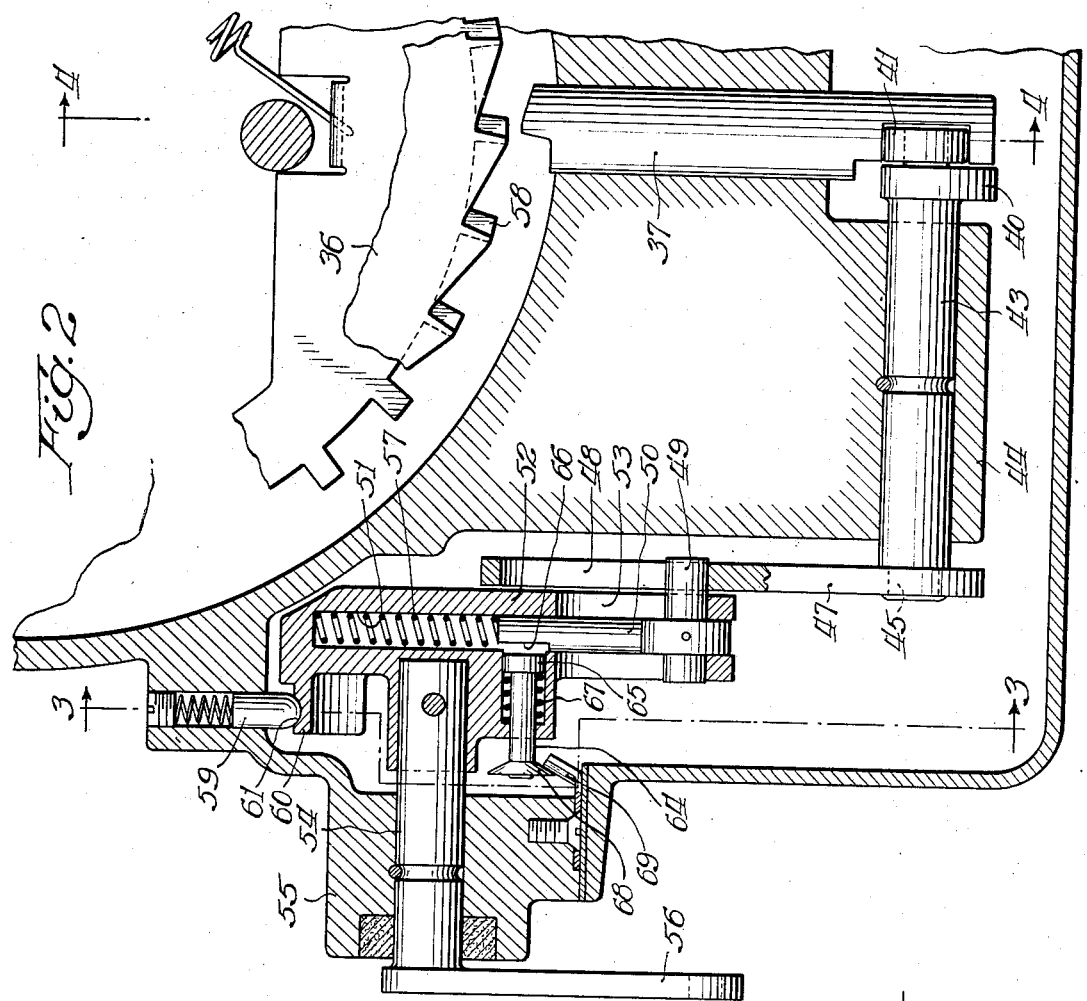
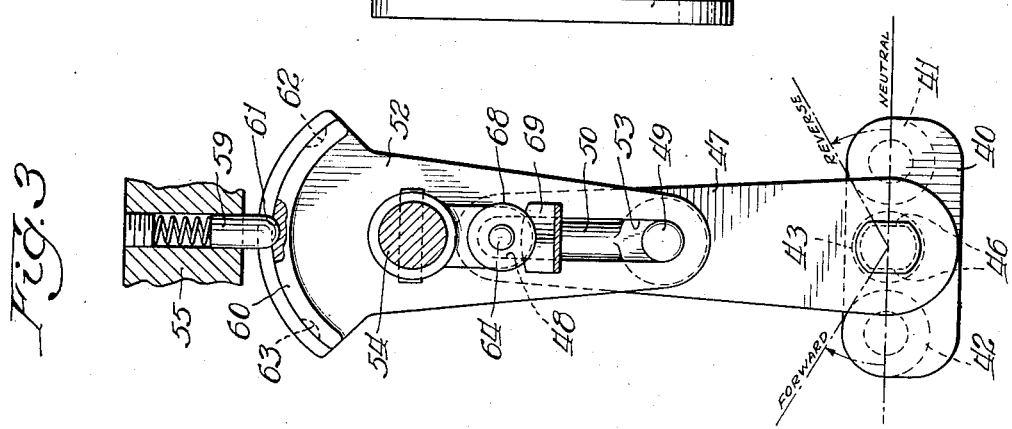

Patented Feb. 6, 1945

2,368,801

UNITED STATES PATENT OFFICE 2,368,801

CONTROL MECHANISM FOR TRANSMISSIONS

Harold E. Carnagua and Donald W. Kelbel, Muncie, Ind., assignors to Borg-Warner Corporation, Chicago, Ill., a corporation of Illinois Application January 9, 1942, Serial No. 426,128

19 Claims. (Cl. 74—473)

This invention relates to power transmitting mechanism and particularly to a control mechanism therefor. This invention will be described with particular reference to its adaptation to a transmission of the type described in John M. Simpson and Harold E. Carnagua application Serial No. 426,122, filed January 9, 1942, but it is to be understood that the invention is not limited in scope to its use in such a transmission and that it may, in fact, be used in a variety of ways as will become apparent hereinafter.

In the Simpson transmission above referred to control means are provided for establishing either a forward drive or a reverse drive through the transmission. The means described comprise positively interengageable elements such as a ratchet wheel and a radially movable, rotationalother establishes a reverse drive. Obviously, it is ly fixed pawl. Operation of one of the pawls establishes forward drive and operation of the other establishes a reverse drive. Obviously, it is imperative that the operation of both pawls be so coordinated that when one is engaged, the other is disengaged in order to avoid establishing both a forward and a reverse drive through the transmission at any one time. The ratchet and pawl mechanism is so designed that under certain conditions the pawl cannot move into engagement with the ratchet wheel, and will remain in such position. It has been found desirable to arrange the controls for the pawls in such a manner that the manual operation will be completed whether or not the engagement of the corresponding pawl is effected.

The principal object of this invention is to provide a control mechanism for a plurality of mutually exclusively operable devices the movement of any one of which is adapted to be blocked, wherein such mutual exclusive operation is insured and provision is made for the blocked condition of one of said elements.

Another object of this invention is to provide a control mechanism for a pair of mutually exclusively operable elements wherein said elements will be locked in position once they have been operated by the control mechanism.

These and other objects and features of this invention will become apparent from the following description when taken together with the accompanying drawings in which:

Fig. 1 is a schematic elevation in section of a transmission to which the invention may be applied;

Fig. 2 is a fragmentary end view in section showing the novel control mechanism;

Fig. 3 is a section taken along lines 3—3 of Fig. 2;

Fig. 4 shows the two mutually exclusively operable transmission control elements and is a front view taken along lines 4—4 of Fig. 2;

Fig. 5 is a side elevation of the control linkage shown in the position assumed when one of the interengageable elements is blocked; and Fig. 6 is a view of the control mechanism of Fig. 5 showing the control mechanism in the position it assumes when the positively interengageable elements of the transmission are fully engaged.

In order to illustrate more clearly the type of transmission to which this invention may be applied, reference is made to Fig. 1 which is a schematic elevation of the Simpson transmission above referred to. In this figure is shown a drive shaft 10, connected to a housing 11 in which are located a torque converter 12 of the hydraulic type and a friction clutch 13. Torque converter 12 is connected to an intermediate shaft 14 which in turn is connected to a planetary gear set 15 and then by means of a drum 16 to a driven shaft 17. Torque converter 12 is comprised of an impeller or pump element 18, a turbine element 19, and a stator element 20, said stator element being connected through a one-way clutch device 21 to a hollow shaft 22 surrounding intermediate shaft 14. Clutch 13 is comprised of a driven friction disc 23 which is positioned between a flange 24 on housing 11 and a pressure plate 25 motivated by a piston 26 which is hydraulically controlled. Friction disc 23 is directly connected to intermediate shaft 14 and it is apparent that when clutch 13 is operated, a direct connection is effected between drive shaft 10 and intermediate shaft 14 around torque converter 12.

Planetary gear set 15 is comprised of a ring gear 27 directly connected to, and rotatable with, drum 16, and a pair of planet pinions 28 and 29 mounted on a carrier 30 which is directly connected to, and rotatable with, intermediate shaft 14. Planet pinion 29 meshes with a sun gear 31 which is directly connected to hollow shaft 22. The arrangement of the planet pinions is such that ring gear 27 meshes with planet pinion 28, which in turn meshes with planet pinion 29, and the latter then meshes with sun gear 31. This double planet pinion arrangement serves to cause the ring and sun gears to rotate in the same direction when carrier 30 is held against rotation.

Planetary gear set 15 is controlled by means of a clutch 32 which connects intermediate shaft 14 with drum 16 thus in effect connecting carrier 30 to ring gear 27 and locking up the planetary gear set so that all the elements thereof rotate as a unit. A second control for planetary gear set 15 is provided in the form of a brake 33 which is applied to arrest the rotation of carrier 30. A third control for the planetary gear set is provided in the form of a brake 34 which may be applied to hollow shaft 22 and its associated sun gear 31 through the intermediary of a roller-and-cam-type connection 35.

The operation of the transmission is as follows:

For neutral, all clutches and brakes are released, thereby removing the necessary reaction points for the transmission of torque. For forward low speed drive, brake 34 is applied, brake 33 is released, and clutches 13 and 32 are likewise released. The application of brake 34 arrests the rotation of sun gear 31 and provides a reaction point for the planetary gear set 15. Torque is then transmitted from drive shaft 10 through housing 11, torque converter 12, intermediate shaft 14 and planetary gear set 15 to drum 16 and driven shaft 17. For the next higher ratio, brake 34 remains engaged and clutch 32 is engaged thereby locking up planetary gear set 15 and effecting a direct connection between intermediate shaft 14 and driven shaft 17. The drive is then from drive shaft 10 as before, through housing 11, torque converter 12, intermediate shaft 14, clutch 32 to drum 16 and driven shaft 17. Although brake 34 remains engaged while clutch 32 is engaged, no interference is experienced between these two controls since roller-and-cam connection 35 releases when the sun gear tends to rotate in the same direction as intermediate shaft 14, that is to say, in a forward direction. For the highest ratio, brake 34 remains engaged, clutch 32 likewise remains engaged and clutch 13 is engaged. This results in a direct connection between drive shaft 10 and intermediate shaft 14 and through clutch 32 to driven shaft 17, thereby establishing a one-to-one drive between drive shaft 10 and driven shaft 17. For reverse drive brake 33 is applied and all other brakes and clutches are released. This arrests the rotation of intermediate shaft 14 and turbine element 19 and permits stator element 20 to rotate along with hollow shaft 22 and sun gear 31. The reversal of functions between turbine element 19 and stator 20 causes stator 20 to rotate reversely, and this reverse rotation is transmitted to hollow shaft 22 to sun gear 31. Due to the double planet pinion arrangement, ring gear 27 is likewise rotated in a reverse direction and with it drum 16 and driven shaft 17.

In the device shown in Fig. 1 brake 33 is comprised of a ratchet wheel 36, which is secured to rotate with carrier 30, and a radially slidable, rotationally fixed pawl 37 adapted to engage ratchet wheel 36 to arrest the rotation thereof. Similarly, brake 34 is comprised of a ratchet wheel 38, secured through roller-and-cam connection 35 to hollow shaft 22, and a radially slidable, rotationally fixed pawl 39 adapted to engage ratchet wheel 38 to arrest its rotation. The mutually exclusive operation of brakes 33 and 34 is obtained by means of a pivoted lever 40 having a roller-and-slot connection 41 with pawl 37 and a similar roller-and-slot connection 42 with pawl 39. By rocking lever 40 one pawl is moved radially outward while the other is moved radially inward, thereby assuring engagement of but one pawl at a time. The novel control means for lever 40 will now be described.

Referring now to Figs. 2 and 3, lever 40 is mounted on a rock shaft 43 journalled in housing 44. The opposite end 45 of rock shaft 43 is reduced in diameter and squared off on two sides as shown at 46 to provide a driving connection and mounting for a lever 47. Lever 47 extends upwardly from rock shaft 43 and is provided at its upper end with a slot 48 in which is located a pin 49. Said pin is mounted in a plunger 50 which is slidable in an opening 51 in an adjacent lever 52. Said lever 52 is likewise provided with a slot 53 in which pin 49 is adapted to ride. Lever 52 is pinned to a rock shaft 54 mounted in a boss 55 in housing 44 and extends outwardly to an exterior control lever 56 which may be connected by means of a Bowden wire or otherwise (not shown) to a steering column shift lever (not shown).

Thus by swinging lever 56 in an arc so as to oscillate rock shaft 54, lever 52 will likewise be rocked and will transmit its motion to pin 49. Said pin in turn will transmit its movement to lever 47 which in turn will oscillate rock shaft 43 and lever 40 to operate pawls 37 and 39. Due to the disposition of the shafts of the lever system pin 49 will tend to ride upward (Fig. 2) to the top of slots 53 and 48 in levers 52 and 47, respectively. A spring 57 in bore 51 normally urges plunger 50 and its associated pin 49 to the bottom of slot 53 against the tendency of the forces acting upon the levers to move the pin upwardly.

Referring to Figs. 2 and 4, it will be observed that ratchet wheel 36 is provided with a blocker element 58 in the form of a toothed wheel which is oscillatable with respect to ratchet wheel 36. In one position blocker 58 extends for a short distance behind a tooth of ratchet wheel 36 so that when the wheel, blocker, and pawl are in the position shown in Fig. 2, radial movement of the pawl 37 toward wheel 36 will be blocked by blocker 58. It is desirable under these conditions to permit lever 56, which is connected to the manual control, to complete its movement without requiring the operator to wait until ratchet wheel 36 and its blocker 58 are moved out of the way of pawl 37. This is accomplished in the mechanism illustrated by the plunger 50 and spring 57.

Referring to Figs. 5 and 6, it will be observed that in both figures lever 52 is shown in its extreme position, but lever 47, which is directly connected to rock shaft 43 and pawl control lever 40, has moved only a fraction of its total distance in Fig. 5 and has moved the remainder of the distance in Fig. 6. The position of lever 47 shown in Fig. 5 corresponds to the blocked position of pawl 37. In this position, since further movement of lever 47 is blocked by the pawl, pin 49 and plunger 50 are forced upward in lever 42 against spring 57, thereby compressing the latter and storing up energy which will be released as soon as pawl 37 is free to move. Just as soon as the blocker moves out of the way of pawl 37, said pawl is then free to move the remainder of its distance into engagement with ratchet wheel 36 and will permit rock shaft 43 and its lever 47 to be rotated. The energy in spring 57 is then utilized to force lever 47 to its extreme position corresponding to the engaged position of pawl 37.

It will be noted that in Fig. 5 the direction of thrust imparted by pin 49 is sufficiently tangential to be fully effective to rotate lever 47.

When pawls 39 and 37 are in neutral position, the levers assume the positions shown in Fig. 3. In this position slots 48 and 53 are aligned and there is no obstruction to the downward movement of plunger 50 under the influence of spring 57. Said plunger and its pin 49 will then be at the bottom of the slots.

In order to locate the neutral, forward and reverse positions, a poppet 59 is provided which cooperates with an arcuate extension 60 on lever 52, said extension having notches 61, 62 and 63 corresponding to neutral, forward and reverse positions.

It is apparent that, considering the lever system alone, lever 47 is positioned solely by the pressure of spring 57, and if sufficient force were developed at one or the other of the pawls to move it out of engagement with its ratchet wheel, there would be no further obstruction to the release of the pawl. Thus the transmission might be jarred out of gear despite the fact that the hand control lever remained in forward or reverse position. To obviate this difficulty a lock mechanism is provided which does not prevent the rocking of shaft 54 by external lever 56 at any time but which does prevent lever 47 from rocking after it has once been moved to engage one or the other of the pawls.

The locking mechanism is disclosed in Fig. 2 and comprises a pin 64 located in lever 52 just below rock shaft 54. Said pin 64 is slidably retained in lever 52 and is connected at one end to a latch 65 which is adapted to cooperate with a notch 66 in plunger 50. A spring 67 normally urges latch 65 toward plunger 50 so that when plunger 50 moves downward to substantially its limiting position in that direction, latch 65 will engage notch 66 and will prevent the return of plunger 50. Thus when lever 47 has been moved to engage one or the other of its pawls so that plunger 50 is at the bottom of its stroke, latch 65 engages notch 66 and prevents the return movement of the plunger thereby locking lever 47 against rotation in a releasing direction. It will be remembered that poppet 59 will retain lever 52 in an engaged position and hence lever 52 cannot rotate with the locked plunger to permit a releasing rotation of lever 47.

Since plunger 50 may travel to the bottom of its stroke when the transmission is conditioned for neutral, and since latch 65 is operative when plunger 50 is at the bottom of its stroke, it would ordinarily be impossible to condition the transmission for forward or reverse from a neutral position. To remedy this difficulty, pin 64 is provided at its free end with a conical washer 68 which is adapted to contact a cam plate 69 secured to boss 55 of housing 44. Cam plate 69 is located in substantially the neutral position of the lever system such that when the transmission is set for neutral, cam plate 69 operates to move conical washer 68 toward the left (Fig. 2) to withdraw latch 65 from notch 66 and to maintain the latch so withdrawn until plunger 50 has moved past the latch sufficiently to prevent further operation of the latch. Cam plate 69 is, of course, operative from either direction, that is, from forward to neutral and from reverse to neutral to effect a release of the latch such as is necessary to condition the lever system for a possible buttending condition of the pawls which may arise from a subsequent reengagement of the pawls.

It is understood that the foregoing description is merely illustrative of preferred embodiment of the invention and that the scope of the invention is not to be limited thereto but is to be determined by the appended claims.

We claim:

1. A control mechanism for a plurality of shiftable elements, one of said elements being provided with means for blocking a complete shift thereof, said mechanism comprising a lever common to at least two of the elements, a readily accessible control lever for actuating said first lever, and connections between the first and second levers, said connections serving to reverse the direction of rotation of the first lever with respect to the second lever and including a lost motion connection to permit the control lever to move to a position corresponding to a complete shift of a shiftable element while said shiftable element is blocked.

2. A control mechanism for a plurality of shiftable elements, one of which is provided with means for preventing a complete shift thereof, said mechanism comprising a lever common to at least two of the elements, a readily accessible control lever for actuating said first lever, and connections between the first and second levers, said connections serving to reverse the direction of rotation of the first lever with respect to the second lever and including a lost motion connection to permit the control lever to move to a position corresponding to a complete shift of a shiftable element while said shiftable element is blocked, and means for completing the shift of the shiftable element after it ceases to be blocked.

3. A control mechanism for a plurality of shiftable elements, said elements being shiftable to positions corresponding to neutral, forward and reverse drive, said mechanism comprising a lever common to at least two of the elements, a control lever for actuating said first lever, connections between the first and second levers, said connections serving to reverse the direction of rotation of the first lever with respect to the second lever, means for locking the first lever against movement relative to the control lever and when so operative being ineffective to prevent movement of the control lever, and means for rendering the locking means ineffective when the shiftable elements are in a neutral position.

4. A control mechanism for a plurality of shiftable elements, said mechanism comprising a pair of overlapping levers pivoted about substantially parallel axes, each of said levers having slots in their overlapping regions, a pin passing through the slots in both levers, a plunger in one lever movable with said pin, and means for urging the plunger toward one end of said slot, said plunger serving to provide different positions of one lever for a given position of the other.

5. A control mechanism as described in claim 4, and a latch mechanism for latching the plunger at the end of its stroke, thereby to lock one lever relative to the other.

6. A control mechanism as described in claim 4, and a latch mechanism for latching the plunger at the end of its stroke, said latch mechanism comprising a pin, means for urging the pin toward the plunger, and cam means for withdrawing the pin from the plunger.

7. A control mechanism as described in claim 4, and a latch mechanism for latching the plunger at the end of its stroke, said latch mechanism comprising a pin, means for urging the pin toward the plunger, and cam means for withdrawing the pin from the plunger, said cam means being effective to free the plunger when said overlapping levers are moving through a predetermined range of angles.

8. A control mechanism as described in claim 4, and poppet means cooperating with one of the levers for defining predetermined positions of said lever.

9. A control mechanism for a plurality of shiftable elements, said mechanism comprising a pair of overlapping levers rotatable about substantially parallel axes, each of said levers having substantially longitudinal slots in their overlapping regions, a pin passing through both slots, a plunger movable with said pin, said plunger being located in one of said levers, spring means normally urging the plunger and pin toward corresponding ends of said slots, said plunger serving to permit one lever to assume a plurality of positions for a given position of the other lever, means for latching the plunger in its end position, means for releasing the latch when the levers move through a predetermined range of angles, poppet means for defining predetermined positions of the lever having the plunger, readily accessible means for operating the last-mentioned lever, and means connecting the other lever to the shiftable element.

10. A control mechanism as described in claim 9, and means for blocking the movement of one of the shiftable elements, said element when blocked causing the plunger to compress the spring until the blocking means is no longer effective, whereupon the compressed spring restores the plunger to its end position, thereby completing a shift of the shiftable element.

11. A control mechanism for a shiftable element, said element being provided with means for blocking a complete shift thereof, said mechanism comprising a lever connected to shift the shiftable element, a control lever pivoted about an axis substantially parallel with that of said first-named lever, said levers being overlapping and each having a slot in its region overlapping the other lever, and a pin passing through the slots in both levers whereby the control lever may be moved to a position corresponding to a complete shift of the shiftable element while the element is blocked.

12. A control mechanism for a shiftable element, said element being provided with means for blocking a complete shift thereof, said mechanism comprising a lever connected to shift the shiftable element, a control lever pivoted about an axis substantially parallel with that of said first-named lever, said levers being overlapping and each having a slot in its region overlapping the other lever, a pin passing through the slots in both levers, and spring means acting on said pin whereby when the control lever is moved to a position corresponding to a complete shift of the shiftable element the spring means functions to move the element into a completely shifted position.

13. A control mechanism for a shiftable element, said element being provided with means for blocking a complete shift thereof, said mechanism comprising a lever connected to shift the shiftable element, a control lever pivoted about an axis substantially parallel with that of said first-named lever, said levers being overlapping and each having a slot in its region overlapping the other lever, a pin passing through the slots in both levers, spring means acting on said pin to move the pin to an end of the slot in said control lever to completely shift the shiftable element, interlocking means for holding said pin at said end of the control lever slot, and poppet means for yieldably holding said control lever in a position corresponding to a complete shift of the shiftable element.

14. A control mechanism for a pair of shiftable elements, said elements being provided with means for blocking complete shifts thereof, said mechanism comprising a lever common to said elements, a control lever for actuating said first lever, connections between the first and second levers, said connections serving to reverse the direction of rotation of the first lever with respect to the second lever and including a lost motion connection to permit the control lever to move to a position corresponding to a complete shift of a shiftable element while said element is blocked, and means cooperating with the control lever for providing definite positions for said lever corresponding to complete shifts of each of said shiftable elements and comprising an arcuate flange movable with the control lever and a rotationally fixed poppet cooperating with the flange, said flange having notches corresponding to complete shift movements of said elements.

15. A control mechanism for a plurality of shiftable elements, said mechanism comprising a lever common to at least two of the elements, a control lever for actuating said first lever, connections between the first and second levers, said connections serving to reverse the direction of rotation of the first lever with respect to the second lever, and means for locking said first lever against an unwarranted shift of the shiftable elements when said second lever is in a position corresponding to a complete shift of one of the shiftable elements, said locking means when so operative being ineffective to prevent movement of the control lever from its position corresponding to a complete shift of one of the shiftable elements.

16. A control mechanism for a shiftable element adapted to engage another element and having a neutral position and an engaging position, said mechanism comprising a lever connected with the element for shifting it and having a neutral position and an operative position corresponding to engaged position of said shiftable element, a second lever for actuating the first lever and having a neutral position and an operative position, resilient means disposed operatively between said levers for transmitting thrust therebetween to move said first lever to its operative position when said second lever is moved to its operative position, and means for locking said resilient means against flexing movement which would allow movement of said first lever from its operative position toward its neutral position when both said levers are in their operative positions.

17. A control mechanism for a pair of shiftable elements, said elements being provided with means for blocking complete shifts thereof, said mechanism comprising a lever common to said elements, a control lever for actuating said first lever, connections between the first and second levers, said connections serving to reverse the direction of rotation of the first lever with respect to the second lever and including a lost motion connection and spring means, said lost motion connection permitting the control lever to move to a position corresponding to a complete shift of a shiftable element while said element is blocked and said spring means completing the shift of the shiftable element after it ceases to be blocked, and means for locking said first lever against an unwarranted shift of one of said elements from a fully shifted position thereof against the action of said spring means when the control lever is in a position corresponding to the fully shifted position of the shiftable element, said locking means when so operative being ineffective to prevent movement of the control lever from its position corresponding to a fully shifted position of the shiftable element.

18. In a transmission, the combination of a pair of shiftable transmission control elements, one of said elements when in shifted condition completing a reverse power train through the transmission and the other when in shifted condition completing a forward power train through the transmission, means for blocking the shifting of each of said elements, a lever common to said elements for shifting the elements, a control lever for actuating said first lever, and connections between the first and second levers, said connections serving to reverse the direction of rotation of the first lever with respect to the second lever and including a lost motion connection to permit the control lever to move to a position corresponding to a complete shift of a shiftable element while said element is blocked.

19. In a transmission, a pair of slotted elements each adapted when held from rotation to complete a power train through the transmission, a pawl for inter-engaging with each of said elements for holding the element against rotation, a blocker element carried by each of said slotted elements and movable relative thereto whereby to block the engagement of the respective pawl with the slotted element, a lever common to said pawls for shifting the pawls, a control lever for actuating said first lever, and connections between the first and second levers, said connections serving to reverse the direction of rotation of the first lever with respect to the second lever and including a lost motion connection to permit the control lever to move to a position corresponding to a complete shift of one of said pawls while the pawl is blocked.

HAROLD E. CARNAGUA.
DONALD W. KELBEL.

CERTIFICATE OF CORRECTION.

Patent No. 2,368,801. February 6, 1945.

HAROLD E. CARNAGUA, ET AL.

It is hereby certified that error appears in the printed specification of the above numbered patent requiring correction as follows: Page 1, first column, line 18, strike out "other establishes a reverse drive. Obviously, it is"; and that the said Letters Patent should be read with this correction therein that the same may conform to the record of the case in the Patent Office.

Signed and sealed this 22nd day of May, A. D. 1945.

Leslie Frazer (Seal) Acting Commissioner of Patents.